Dec. 22, 1953

L. C. WARNER 2,663,114

FISHING LEADER HOLDER

Filed Feb. 15, 1951

INVENTOR.

Leonard C. Warner

Patented Dec. 22, 1953

2,663,114

UNITED STATES PATENT OFFICE 2,663,114

FISHING LEADER HOLDER

Leonard C. Warner, Waterbury, Conn.

Application February 15, 1951, Serial No. 211,031

1 Claim. (Cl. 43—54.5)

This invention relates to a holder for fishing tackle and more particularly to a leader holder. One of the objects of this invention is to provide a leader holder that will accommodate various lengths and sizes of leaders and hold them in a separated state and one that is easily accessible for removal and assembly purposes.

Another object is to provide a leader holder that is simple in construction, easy to manipulate and store in a fishing kit or one's clothing pocket and ornamental in appearance. Other objects and advantages will become apparent in the detailed description of the invention.

Detailed description

Referring to the accompanying drawing in which I have disclosed one preferred embodiment of my invention, the numeral 5 designates a rectangular shaped support plate having a rolled barrel or tubular section 6 integrally formed at each of the short ends of said plate and said tubular section preferably positioned to lie entirely to one side of the plane of said plate 5.

Figure 3:
Fig. 3 is a plan view of one of the coiled springs, per se, as used in the holder.
Figure 4:
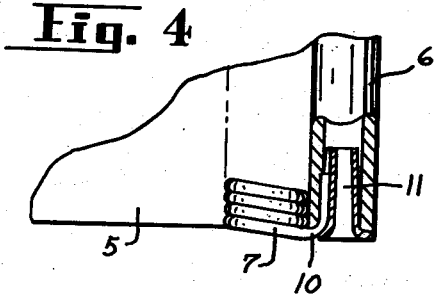
Fig. 4 is a plan view of one corner of the holder with a portion broken away to show a part of the concealed construction.

Positioned adjacent to each of the tubular sections 6 is a specially designed coiled spring 7, which consists of a series of closely wound coils or helices 8, and a series of interposed openly wound coils or helices 9, as in Fig. 3. The opposite ends of each of the springs 7 are formed with hooked sections 10 that are designed to be anchored into the opposite open ends of the barrels 6 as best shown in Fig. 4.

These anchored ends 10 may be permanently held in place as by a tubular tapered rivet 11 driven into said barrel ends and pinching the spring hooked ends 10 between said rivet 11 and the interior surface of said barrels 6. The diameter of these springs 7 are preferably made approximately twice the diameter of the barrels 6 in order that a substantial portion of the springs 7 will project above said barrels on the same side of the support plate 5 on which said barrels are disposed. This will allow the leader ends to enter at least halfway into the spring coils for a firm grip.

Figure 1:
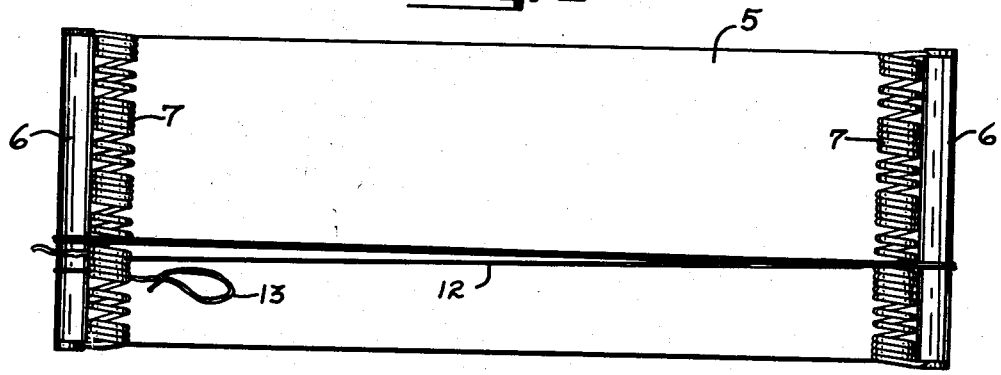
Fig. 1 is a plan view of the leader holder.
Figure 2:
Fig. 2 is a side view of the same.

The leaders for which my leader holder is designed to accommodate are generally purchased in 3, 4½, 6, 7½, 9 foot lengths as an average and may be as long as 30 feet. The leaders are designated by the numeral 12 and are usually provided with an end loop 13, one leader being shown assembled on the leader holder in the drawing Fig. 1. As here shown the end of the leader adjacent the loop 13 will be forced down from the top between two adjacent helices of the closely wound coils 8 and then the leader will be wrapped about the barrels 6 with the strands of said leader disposed in between the helices of the open wound coils 9 as shown in Figs. 1 and 3. The end of the leader opposite from the loop 13 may be secured in either of the springs 7 depending on the length of the leader and preferably anchored in the spring which is nearest to the leader end when completely wound on the holder.

The plate 5 and integral end barrels 6, which is the main part of the holder, is preferably made of aluminum and anodized so as to be noncorrosive, but it is to be understood that it could be made of other noncorrosive material such as plastic, and the springs 7 for a like reason are made of Phosphor bronze wire but could also be made of other noncorrosive material such as silver wire. The plate 7 is made up to be about 2⅜ inches wide and 7 inches long so as to be conveniently carried in a pocket of the type of garment generally worn by fishermen and also will easily fit into the conventional types of fishing tackle box carried by fishermen.

The barrelled or enlarged ends 6 are a means to keep the leaders from being cut or kinked when wrapped thereabout.

Leaders are usually purchased in a round coiled state, either on cardboard or in envelopes. If such leaders are attached directly to a fishing line, they will interfere with straight casting, due to the fact that there will be a spiral twist in the leader.

On the other hand, if the leaders are wound on my holder for a period of time, when unwound the leader material will not curl or kink, and the slight bends, caused by the rolled ends of the plate, can be easily removed by pulling the leader through a closed thumb and forefinger.

While I have shown and described a preferred embodiment of my invention, it should be understood that various changes in construction may be resorted to if desired, such as will come within the scope of the appended claim.

I claim:

A holder for a fishing leader comprising a flat plate provided with rounded ends defining hollow beads extending transversely across the plates, coiled springs of greater diameter than the beads, positioned on the inner side of the beads, and above the upper surface of the plate, said coils having end portions ending laterally of and parallel to the axis of the coils and in spaced relation thereto and positioned within the hollows of the beads, and means securing the end portions within and in contact with the beads, said springs having alternate closely positioned and widely spaced coils whereby a leader may be extended around both beads and lie between the widely spaced coils and the opposite ends of the leader may be held in secured relation to the coils by the closely spaced coils, positioning the major portion of the leader between the coils in substantially parallel relation to the plate.

LEONARD C. WARNER.

References Cited in the file of this patent

UNITED STATES PATENTS

| Number | Name | Date |
|---|---|---|
| 495,102 | Reid | Apr. 11, 1893 |
| 863,005 | Smith | Aug. 13, 1907 |
| 966,609 | Shannon | Aug. 9, 1910 |
| 2,080,805 | Brey | May 18, 1937 |
| 2,501,443 | Fitzsimmons | Mar. 21, 1950 |